UNITED STATES PATENT OFFICE.

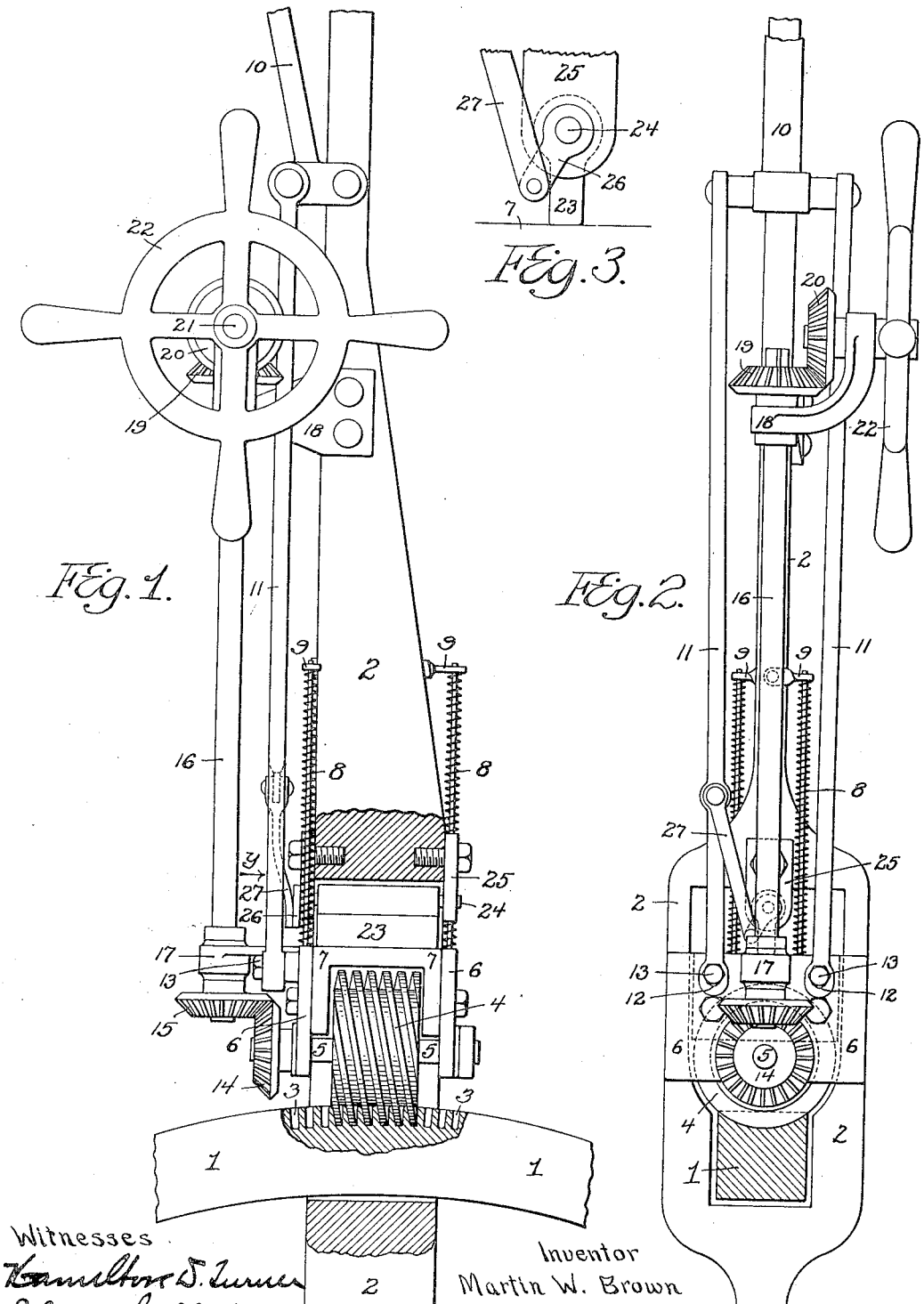

MARTIN W. BROWN, OF NEW YORK, N. Y.

REVERSING MECHANISM FOR ENGINES.

1,104,621. Specification of Letters Patent. Patented July 21, 1914.

Application filed January 17, 1913. Serial No. 742,635.

*To all whom it may concern:*

Be it known that I, MARTIN W. BROWN, a citizen of the United States, residing in New York city, New York, have invented certain Improvements in Reversing Mechanism for Engines, of which the following is a specification.

My invention relates to means for locking the reverse lever of a locomotive engine to the toothed quadrant with which the same coöperates and to means for adjusting said reverse lever in respect to said toothed quadrant, the objects of my invention being to prevent accidental release of the reverse lever from the quadrant; to insure safety in effecting adjustment of the lever when the engine is traveling at high speed, and to provide for fine gradations in such adjustments. These objects I attain in the manner hereinafter set forth, reference being had to the accompanying drawing, in which—

Figure 1 is a view, partly in side elevation and partly in longitudinal section, of a reverse lever and part of the quadrant bar, illustrating my improved means for locking the lever to the bar and effecting adjustment of the same in respect to the bar; Fig. 2 is an end view of the device looking in the direction of the arrow *x*, Fig. 1, and Fig. 3 is an enlarged view of part of the mechanism looking in the direction of the arrow *y*, Fig. 1.

In the drawing, 1 represents part of a toothed quadrant bar and 2 part of a reverse lever operating in conjunction therewith, this lever being pivoted below the bar in such relation thereto that that member of the reverse lever which engages with the toothed portion of the bar will travel in a line concentric with the latter.

The upper surface of the bar has formed in it worm teeth 3 extending throughout a segment of the desired length and meshing with a worm wheel 4, the latter being secured to a shaft 5 which is free to turn in suitable bearings in opposite side plates 6, the latter being secured to an intervening bridge piece 7 so as to move in unison with one another. The worm-carrier comprising the side plates 6 and bridge piece 7 is guided in a recessed portion of the reverse lever 2 so as to be susceptible of movement from and toward the toothed quadrant 1, movement of said carrier toward the quadrant being effected by means of coiled springs 8 interposed between the side plates 6 and projecting lugs 9 on the lever, and movement of the carrier away from the quadrant bar being effected by means of a lever 10 pivoted to the upper portion of the reverse lever and connected to said carrier by means of rods 11 whose lower ends are vertically slotted, as shown at 12 in Fig. 2, for the reception of bolts 13 carried by one of the side plates 6. The shaft 5 of the worm 4 has, at one end, a bevel wheel 14 which meshes with a similar bevel wheel 15 at the lower end of a vertical shaft 16, the latter being adapted to bearings in suitable brackets 17 and 18 located in front of the reverse lever 2.

The shaft 16 is provided at its upper end with a bevel wheel 19 which is in mesh with a similar bevel wheel 20 at the inner end of a shaft 21, the latter being free to turn in an extension of the upper bearing 18, and being provided, at its outer end, with a hand wheel 22 whereby it may be turned in either direction. Located in the recessed portion of the reverse lever, above the worm carrier, is a cam 23 whose shaft 24 is adapted to bearings in brackets 25 secured to the front and rear sides of the lever 2 and said shaft 24 has at one end an arm 26 which is connected by a link 27 to one of the rods 11, as shown in Fig. 2.

Normally, the worm wheel 4 is in mesh with the teeth 3 of the quadrant bar 1 and if it is desired to effect adjustment of the lever 2 in respect to said quadrant bar when the engine is at rest or is running at a low rate of speed, such adjustment is effected by pressing upon the lever 10 so as to withdraw the worm wheel from engagement with the teeth of the quadrant bar, said lever 10 being released from pressure when the desired adjustment of the lever 2 has been effected so as to permit the worm wheel to be again moved into engagement with the teeth of the quadrant bar, by the action of the springs 8. Normally, also, the cam 23 occupies the locking position shown in Fig. 1, but the first effect of the pressure upon the lever 10 is to move said cam 23 out of its locking relation because of the connection 27, between the rod 11 and the arm 26 on the cam shaft, such movement preceding any lift of the worm carrier because of the slots 12 formed in the lower ends of the connecting rods 11 for the reception of the bolts 13. As soon, however, as the cam 23 has been moved out of its locking position the worm carrier will be lifted so as to withdraw the worm wheel 4 from engagement with the worm teeth 3 and the lever 2 is then free to be adjusted to any desired position. As soon as pressure upon the lever 10 is released, however, the worm carrier will be depressed by the action of the springs 8 and will again mesh with the teeth of the quadrant bar, the final effect of the downward movement of the bars 11 being to move the locking cam 23 into the position shown in Figs. 1 and 3 so as to effectively lock the worm carrier in its depressed position and prevent any accidental release of the teeth of the worm from engagement with those of the quadrant bar.

When an engine is running at high speed the shock on the reverse lever due to the inertia of the valve mechanism is very powerful and it is therefore important to prevent the release of said reverse lever from the control of the quadrant because of the accidental movements of said reverse lever which are otherwise likely to be caused and which have frequently resulted in injury to the engine driver. Even when the worm wheel is used as a means of engaging the reverse lever with the quadrant the vibrations due to the rapid reversals in the position of parts of the valve mechanism tend to free the worm from engagement with the teeth of the quadrant, hence the means of locking said worm so that it can not be thus released. When the engine is running at high speed, therefore, I prefer to effect movements of the lever 2 in respect to the toothed quadrant 3 by rotating the worm wheel 4 through the medium of the hand wheel 22 and the interposed gearing previously described. The bevel wheel 19 is splined or otherwise suitably connected to the shaft 16 so as to permit of vertical movement of the latter along with the worm and its carrier while still maintaining rotative connection between the said shaft and bevel wheel.

The hand wheel 22 is located in proximity to the lever 10 so that it can be operated by the engine driver with the same facility as said hand lever and without changing his customary position in the cab of the engine.

The springs 8 are disposed diagonally opposite each other so that they will not interfere with the mechanism for operating the cam 23 and will exert their force adjacent to each edge of the worm carrier. The cam bar 23 bears directly upon the top of the worm carrier 7 and thus as it swings downwardly into locking position insures the full depression of the worm carrier so as to cause its worm to properly engage with the teeth of the quadrant, a result which could not be effected by the rods 11 alone, because of the slots 12 in said rods for the reception of the bolts 13 whereby they are connected to the worm carrier.

I claim:

1. The combination, in a reversing device for engines, of a toothed quadrant, a reverse lever, a worm for engaging the toothed quadrant, a worm carrier movable on the reverse lever so as to carry the worm into or out of engagement with said toothed quadrant, a raising and lowering device for the worm carrier, a locking cam bearing upon the top of the worm carrier and serving, as it swings into locking position, to depress said carrier and thus insure engagement of the worm with the toothed quadrant, and means for operating said locking cam.

2. The combination, in a reversing device for engines, of a toothed quadrant, a reverse lever, a worm for engaging the toothed quadrant, a worm carrier movable on the reverse lever for engaging and disengaging the worm, means for lifting said worm carrier on the reverse lever, and a pair of springs for depressing the worm carrier, said springs being disposed diagonally opposite one another, whereby one acts adjacent to the edge of the worm carrier at one side thereof and the other adjacent to the edge of the worm carrier at the opposite side thereof.

3. The combination, in a reversing device for engines, of a toothed quadrant, a reverse lever, a worm for engaging said toothed quadrant, a worm carrier movable on said reverse lever so as to engage or disengage said worm, means for imparting such movement to the worm carrier, a shaft geared to the worm and extending in line with the reverse lever but movable with the worm carrier, a shaft mounted in a fixed bearing on the reverse lever, and gear members connecting said shafts, that member which is carried by the worm-operating shaft being splined thereto so as to permit movement of said shaft with the worm carrier without deranging the gearing.

In testimony whereof, I have signed my name to this specification, in the presence of two subscribing witnesses.

MARTIN W. BROWN.

Witnesses:
KATE O. BEADLE,
HAMILTON D. TURNER.